US009534972B2

United States Patent
Eichhorn et al.

(10) Patent No.: US 9,534,972 B2
(45) Date of Patent: Jan. 3, 2017

(54) PRESSURE SENSOR WITH A DEFORMABLE ELECTRICALLY RESISTIVE MEMBRANE

(71) Applicant: 7-SIGMA INC., Minneapolis, MN (US)

(72) Inventors: Wade R. Eichhorn, Minneapolis, MN (US); Richard Duda, Stillwater, MN (US); Kristian G. Wyrobek, Minneapolis, MN (US)

(73) Assignee: 7-SIGMA Inc., Minneapolis, MN (US)

( * ) Notice: Subject to any disclaimer, the term of this patent is extended or adjusted under 35 U.S.C. 154(b) by 188 days.

(21) Appl. No.: 14/137,984

(22) Filed: Dec. 20, 2013

(65) Prior Publication Data

US 2015/0177079 A1    Jun. 25, 2015

Related U.S. Application Data

(63) Continuation-in-part of application No. 13/599,935, filed on Aug. 30, 2012, now Pat. No. 8,746,075, which (Continued)

(51) Int. Cl.
*G01L 7/16* (2006.01)
*G01L 9/00* (2006.01)
(Continued)

(52) U.S. Cl.
CPC ............. *G01L 9/0054* (2013.01); *B82Y 15/00* (2013.01); *B82Y 30/00* (2013.01); *G01L 7/16* (2013.01); *Y10S 977/773* (2013.01)

(58) Field of Classification Search
CPC ................ G01B 7/16; G01L 1/20; G01L 1/16; G01L 1/18; G01L 7/16; B82Y 15/00; B83Y 30/00

(Continued)

(56) References Cited

U.S. PATENT DOCUMENTS 3,739,644 A * 6/1973 Underwood .......... G01L 9/0054
338/4
3,817,107 A * 6/1974 Shimada ............... G01L 9/0054
338/4

(Continued)

FOREIGN PATENT DOCUMENTS

NO    WO 9220096 A1 * 11/1992  .............. G01P 1/023
WO    WO2014003878        1/2014

OTHER PUBLICATIONS

Wichmann et al., Phys. Rev. B 80, 245437, 2009.*

(Continued)

*Primary Examiner* — Lisa Caputo
*Assistant Examiner* — Nathaniel T Woodward
(74) *Attorney, Agent, or Firm* — Patterson Thuente Pedersen, P.A.

(57) ABSTRACT

A pressure sensing element has at least a housing containing a fluid. The housing has at least two moveable surfaces in contact with the fluid in the housing; There is a first moveable surface comprising a pressure application surface which, when moved towards, away from, into or out of the fluid, creates a change in fluid pressure and a second moveable surface in contact with the fluid in the housing comprising a membrane which, when deformed by pressure changes in the fluid, alters its electrical resistance. The membrane has two electrodes attached to deformable material in the membrane. The membrane my have an elastomer having conductive particles distributed therein. The elastomer may be a dielectric and the particles are conductive nanoparticles.

21 Claims, 4 Drawing Sheets

Related U.S. Application Data is a continuation of application No. 13/397,737, filed on Feb. 16, 2012, now Pat. No. 8,850,897.

(51) Int. Cl.
*B82Y 15/00* (2011.01)
*B82Y 30/00* (2011.01)

(58) Field of Classification Search
USPC .......................... 73/774, 763, 760, 264, 744
See application file for complete search history.

(56) References Cited

U.S. PATENT DOCUMENTS

| | | | |
|---|---|---|---|
| 5,335,549 A * | 8/1994 | Kato | G01L 9/0052 73/706 |
| 5,483,994 A * | 1/1996 | Maurer | G01L 19/0645 138/30 |
| 7,081,030 B2 | 7/2006 | Liu et al. | |
| 7,129,467 B2 | 10/2006 | Wincheski et al. | |
| 7,278,324 B2 | 10/2007 | Smits et al. | |
| 7,399,400 B2 | 7/2008 | Soundarrajan et al. | |
| 7,404,338 B2 | 7/2008 | Hierold et al. | |
| 7,453,085 B2 | 11/2008 | Chang et al. | |
| 7,645,497 B2 | 1/2010 | Spath et al. | |
| 7,673,521 B2 | 3/2010 | Ajayan | |
| 7,730,547 B2 | 6/2010 | Barrera | |
| 8,132,468 B2 | 3/2012 | Radivojevic | |
| 8,250,927 B2 | 8/2012 | Anand et al. | |
| 8,492,755 B2 | 7/2013 | Hu et al. | |
| 8,495,917 B2 | 7/2013 | Radivojevic | |
| 8,587,422 B2 | 11/2013 | Andrews et al. | |
| 8,746,075 B2 | 6/2014 | Eichhorn et al. | |
| 8,850,897 B2 | 10/2014 | Eichhorn et al. | |
| 8,943,897 B2 | 2/2015 | Beauvais et al. | |
| 2008/0129278 A1 | 6/2008 | Dai et al. | |
| 2008/0238882 A1 | 10/2008 | Sivarajan et al. | |
| 2009/0293631 A1 | 12/2009 | Radivojevic | |
| 2011/0148815 A1 | 6/2011 | Tsai | |
| 2011/0239731 A1 | 10/2011 | Lisseman et al. | |
| 2011/0316522 A1 | 12/2011 | Shinobu | |
| 2012/0073388 A1 | 3/2012 | Chibante et al. | |
| 2012/0266685 A1 | 10/2012 | Choi et al. | |
| 2013/0031987 A1 | 2/2013 | Beauvais et al. | |
| 2013/0104665 A1 | 5/2013 | Biris et al. | |
| 2013/0218050 A1 * | 8/2013 | Eichhorn | B82Y 15/00 600/587 |
| 2014/0128687 A1 | 5/2014 | White et al. | |
| 2014/0150573 A1 | 6/2014 | Cannard et al. | |
| 2014/0220422 A1 | 8/2014 | Rogers et al. | |
| 2014/0272870 A1 | 9/2014 | Eichhorn et al. | |
| 2014/0275795 A1 | 9/2014 | Little et al. | |
| 2014/0305226 A1 | 10/2014 | Eichhorn et al. | |
| 2015/0011843 A1 | 1/2015 | Toth et al. | |
| 2015/0044656 A1 | 2/2015 | Eichhorn et al. | |
| 2015/0064675 A1 | 3/2015 | Eichhorn et al. | |
| 2015/0109006 A1 | 4/2015 | Choi et al. | |

OTHER PUBLICATIONS www.mech.northwestern.edu/FOM/LiuCh06v3_072505.pdf; Jul. 25, 2005.

"A Carbon Nanotube/Polymer strain sensor with linear and anti-symmetric piezoresistivity", Gang Yin et al., Published online before print Apr. 26, 2011, doi:10.1177/0021998310393296 Journal of Composite Materials. Jun. 2011. vol. 45. No. 12 1315-1323.

Bozovic, et al., Plastic Deformations in Mechanically Strained Single-Walled Carbon Nanotubes, Department of Physics and Chemistry and Chemical Biology. Harvard University MA02138 (16 pages) 2003.

Flexible Strain Sensor Based on Carbon Nanotube Rubber Composites, Jin-Ho Kim et al., Nanosensors, Biosensors and Info-Tech Sensors and Systems 2010, edited by Vijay K. Varadan, Proc. of SPIE vol. 7646, 76460N.

Piezoresistive response of epoxy composites with carbon nanoparticles under tenssile load, Wichmann, Melte H.G., et al., Physical Review b80, 245437 (2009), The American Physical Society).

Supersensitive linear piezoresistive property in carbon nanotubes/silicone rubber nanocomposites, Zhi-Min Dang et al., Journal of Applied Phyisics, 104, 024114 (2008), American Institute of Physics.

Application and File History for U.S. Appl. No. 13/397,737, filed Feb. 16, 2012, inventors Eichhorn et al.

Application and File History for U.S. Appl. No. 13/599,935, filed Aug. 30, 2012, inventors Eichhorn et al.

Application and File History for U.S. Appl. No. 14/263,872, filed Apr. 28, 2014, inventors Eichhorn et al.

Application and File History for U.S. Appl. No, 14/494,577, filed Sep. 23, 2014, inventors Eichhorn et al.

Application and File History for U.S. Appl. No. 14/015,951, filed Aug. 30, 2013, inventors Eichhorn et al.

Office Action, for U.S. Appl. No. 14/263,872, dated Aug. 4, 2016, 12 pages.

* cited by examiner

PRESSURE SENSOR WITH A DEFORMABLE ELECTRICALLY RESISTIVE MEMBRANE

RELATED APPLICATIONS DATA

This application is a Continuation-in-Part application of and claims priority under 35 USC 120 from U.S. patent application Ser. No. 13/599,935, filed 30 Aug. 2012, which in turn claims priority from U.S. patent application Ser. No. 13/397,737 filed Feb. 16, 2012.

BACKGROUND OF THE INVENTION

1. Field of the Invention

The present invention relates to the field of sensor technology, particularly sensors that can detect pressure, forces, stress, strain and deformation. The technology relates to apparatus, methods and systems in which the present sensor technology is embedded or to which the present sensor technology has been retrofit.

2. Background of the Art

A pressure sensor measures pressure, typically of gases or liquids. Pressure is an expression of the force required to stop a fluid from expanding, and is usually stated in terms of force per unit area. A pressure sensor usually acts as a transducer; it generates a signal as a function of the pressure imposed. Generally such a signal is electrical.

Pressure sensors are used for control and monitoring in thousands of everyday applications. Pressure sensors can also be used to indirectly measure other variables such as fluid/gas flow, speed, water level, and altitude. Pressure sensors can alternatively be called pressure transducers, pressure transmitters, pressure senders, pressure indicators and piezometers, manometers, among other names.

Pressure sensors can vary drastically in technology, design, performance, application suitability and cost. A conservative estimate would be that there may be over 50 technologies and at least 300 companies making pressure sensors worldwide.

There is also a category of pressure sensors that are designed to measure in a dynamic mode for capturing very high speed changes in pressure. Example applications for this type of sensor would be in the measuring of combustion pressure in an engine cylinder or in a gas turbine. These sensors are commonly manufactured out of piezoelectric materials such as quartz.

Some pressure sensors, such as those found in some traffic enforcement cameras, function in a binary (off/on) manner, i.e., when pressure is applied to a pressure sensor, the sensor acts to complete or break an electrical circuit. These are also useful in pressure pads used in security systems. These types of sensors are also known as a pressure switch.

There are many applications for pressure sensors:

Pressure Sensing

This is where the measurement of interest is pressure, expressed as a force per unit area. This is useful in weather instrumentation, aircraft, security systems, sleep monitors, automobiles, and any other machinery that has pressure functionality implemented.

Altitude Sensing

This is useful in aircraft, rockets, satellites, weather balloons, and many other applications. All these applications make use of the relationship between changes in pressure relative to the altitude. Barometric pressure sensors can have an altitude resolution of less than 1 meter, which is significantly better than GPS systems (about 20 meters altitude resolution). In navigation applications altimeters are used to distinguish between stacked road levels for car navigation and floor levels in buildings for pedestrian navigation.

Flow Sensing

This is the use of pressure sensors in conjunction with the venturi effect to measure flow. Differential pressure is measured between two segments of a venturi tube that have a different aperture. The pressure difference between the two segments is directly proportional to the flow rate through the venturi tube. A low pressure sensor is almost always required as the pressure difference is relatively small.

Level/Depth Sensing

A pressure sensor may also be used to calculate the level of a fluid. This technique is commonly employed to measure the depth of a submerged body (such as a diver or submarine), or level of contents in a tank (such as in a water tower or liquid storage facility). For most practical purposes, fluid level is directly proportional to pressure.

Leak Testing

A pressure sensor may be used to sense the decay of pressure due to a system leak. This is commonly done by either comparison to a known leak using differential pressure, or by means of utilizing the pressure sensor to measure pressure change over time.

It is desirable to be able to provide high quality, sensitive and inexpensive pressure sensing elements and systems and methods into a wide field of technical and commercial practices.

SUMMARY OF THE INVENTION

A sensing element is used to provide capability to measure pressures, changes in pressure, deformation and changes in other conditions that can be related to pressure and pressure changes. The element may have:

a housing containing a fluid;

the housing having at least two moveable surfaces in contact with the fluid in the housing;

a first moveable surface comprising a pressure application surface which, when moved towards, away from, into or out of the fluid, creates a change in fluid pressure;

a second moveable surface in contact with the fluid in the housing comprising a membrane which, when deformed by pressure changes in the fluid, alters its electrical resistance.

DETAILED DESCRIPTION OF THE INVENTION

Figure 1:
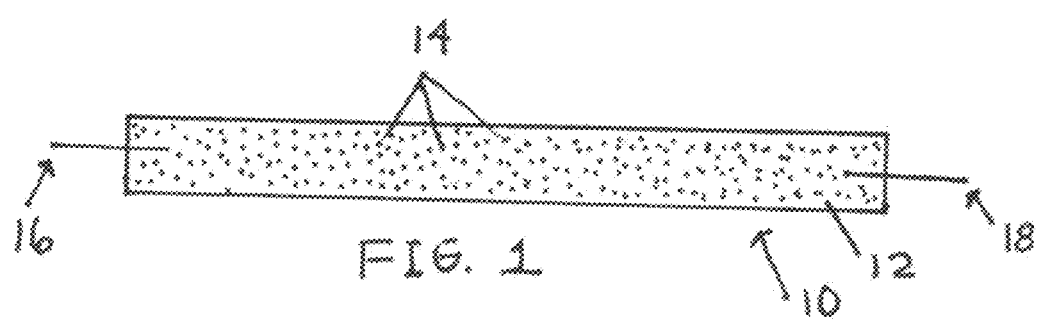
FIG. 1 shows a side view of a membrane useful in the practice of the present technology.

The technology and devices of the present invention may be used within a wide range of technical fields, including but not limited to medical fields, fluid transmissions fields, storage systems, traffic systems, security systems, automotive and vehicular fields, aeronautical fields, physical therapy fields, physical and athletic testing fields, ergonomic sensing fields, thermal control fields, prosthetic fitting and adjustment fields, and the like.

The systems of the present technology may be complete devices in and of themselves, or may be retrofit or added to separate fully-operative devices to provide an enhanced capability of sensing or measuring or otherwise evaluating performance or conditions of use of the fully-operative devices to which the present technology is added.

One aspect of the present technology includes a pressure sensing element including a housing containing a fluid; the housing having at least two moveable surfaces in contact with the fluid in the housing; a first moveable surface comprising a pressure application surface which, when moved towards, away from, into or out of the fluid, creates a change in fluid pressure; a second moveable surface in contact with the fluid in the housing comprising a membrane which, when deformed by pressure changes in the fluid, alters its electrical resistance.

The first moveable surface may be a membrane, a film, a flexible surface having some structural permanence (e.g., a polymeric film, a metal or composite film, and elastomeric film or the like), a moveable element of a mechanical component (e.g., a piston, a sliding or reciprocating element, an extendable element, a needle, syringe or probe, an inflatable element, an expandable element (e.g., expanding by physical drive, thermal expansion, magnetic force, etc.), or any other component that can move to apply pressure or alter pressure on the fluid confined within the housing. These variations will be explored in greater detail herein.

The second moveable surface in contact with the fluid may be a membrane of an elastically deformable composition whose resistance alters upon deformation at least upon deformation of 1% in length (although deformations of 0.1%, and deflection of 0.1 degrees have been contemplated if not evidenced). Preferred materials and constructions of the membrane are disclosed in copending, commonly-assigned, U.S. patent application Ser. No. 13/599,935, filed 30 Aug. 2012, which in turn claims priority from U.S. patent application Ser. No. 13/397,737 filed Feb. 16, 2012 which are incorporated herein by reference in their entirety.

The term membrane is used here to distinguish from technology in which the term balloon is used. Although a balloon may have a membrane surface, and the balloon interior surface may be in contact with a fluid, a balloon is usually considered as a structure that completely encapsulates and confines a fluid (by itself), with the balloon structure itself comprising at least 80% of the confining surface area, if not confining 100% of the fluid against its interior surfaces except for closing elements that block previously open ports through which confined fluids were introduced (e.g., plugs, blocking elements, inserts, adhesive, and the like).

The housing may be a complete device, an insert or an attachable overlay, and the space between the two moveable surfaces may be quite small (e.g., 0.01 or 0.015 or 0.020 or 0.025 mm) to more significant structural dimensions such as 10, 20 30 or 100 centimeters. Most preferred systems have the two moveable systems separated by dimensions through the liquid (from parallel surfaces, along a linear path, from surfaces in perpendicular or angular opposition other than parallel, around a curve, around an angle, etc., as the pressure transmitted through the fluid need not be from parallel opposed surfaces) of between 0.015 mm to 20 cm.

Nanocomposite Definition:

Nanomaterials that combine one or more separate components in order to obtain the best properties of each component (composite). In nanocomposite, nanoparticles (clay, metal, carbon nanotubes) act as fillers in a matrix, usually polymer matrix.

Nanomaterials Definition:

nanomaterials can be defined as materials which have structured components with at least one dimension less than 100 nm. Materials that have one dimension in the nanoscale are layers, such as a thin films or surface coatings. Some of the features on computer chips come in this category. Materials that are nanoscale in two dimensions include nanowires and nanotubes. Materials that are nanoscale in three dimensions are particles, for example precipitates, colloids and quantum dots (tiny particles of semiconductor materials). Nanocrystalline materials, made up of nanometer-sized grains, also fall into this category. Preferred dimensions for nanotubes are diameters of from 3 Angstroms, preferably at least 5 Angstroms, more preferably at least 10 Angstroms up to 100 nm, preferably up to 70 nm, more preferably up to 50 nm. Preferred ranges of diameters for nanotubes according to the present invention are from 0.5 nm to 30 nm.

Nanometer Definition:

One nanometer (nm) is equal to one-billionth of a meter, $10^{-9}$ m. Atoms are below a nanometer in size, whereas many molecules, including some proteins, range from a nanometer upwards.

Nanoparticle Definition:

Nanoparticles are particles of less than 100 nm in diameter. The preferred size range for diameters of nanotubes described above tends to be a preferred range for the largest dimension of nanoparticles also.

Nanotube Definition (Carbon Nanotubes):

Carbon nanotubes (CNTs) were discovered by Sumio Iijima in 1991. Carbon nanotubes are generally fullerene-related structures which consist of rolled graphene sheets, although multiple molecular level structures of nanotubes and variations in structure have been created and described. There are two generic types of CNT: single-walled (one tube) or multi-walled (more tubes). Both of these are typically a few nanometers in diameter and several micrometers to centimeters long.

Nanowires Definition:

Nanowires are ultrafine wires or linear arrays of dots, made from a wide range of materials, with nanodimension diameters. These are essentially extremely long nanotubes in some instances.

Elastomeric Polymers

Elastomers are usually thermoset resins (requiring cross-linking or vulcanization) but may also be thermoplastic polymers. The polymer chains are cross-linked during curing, i.e., vulcanizing. The molecular structure of elastomers can be imagined as a 'spaghetti and meatball' structure, with the meatballs signifying cross-links. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend (at least once, and preferably repeatedly without inelastic deformation occurring) from 5-700%, depending on the specific material. Without the cross-linkages or with short, uneasily reconfigured chains, the applied stress would more likely result in a permanent deformation. Temperature effects are also present in the demonstrated elasticity of a polymer. Elastomers that have cooled to a glassy or crystalline phase will have less mobile chains, and consequentially less elasticity, than those manipulated at temperatures higher than the glass transition temperature of the polymer. It is also possible for a polymer to exhibit elasticity that is not due to covalent cross-links. For example, crystalline polymers can be treated to alter their short range versus long range crystalline morphology to alter the elastic properties as well as other physical properties.

Underlying technology within the scope of the present invention includes both sensors and methods of using sensors in processes or procedures. The novel articles used as sensors in the practice of the present technology comprise millimeter dimension (diameters and or three major dimensions between 0.1 or 0.2 to 100 mm) polymeric structures comprising from 0.2% to 8% by total weight of conductive nanotubes. The articles must have some degree of elastic deformation properties. For example, the article should be able to deform (bend, stretch, flex, extend, etc.) such that in at least one dimension (e.g., the length of a nanotube) there can be at least 5% total elastic deformation. That deformation could be measured from a base line 0 stress article with a return to that base line 0 stress (unstressed) length that has not inelastically changed by more than 0.5%. When used, the articles must have electrodes attached across the conductive dimension of the article, preferably aligned with the dimension of expected stress and elongation. Although the electrodes may be separated so as to extend perpendicularly or acutely or obtusely with respect to the expected dimension of elongation and stress, the peizoresistive effect is more accurately measured along a single dimension (or possibly along multiple directions, as the nanotubes often are not uniformly aligned, but may curl and twist into three dimensional form) parallel with the stress and elongation. The article may have electrodes fixed into the structure or may have attachment points for attaching the electrodes and placing them into contact with the conductive layer. The electrodes would extend to and be in electrical communication connection with a current or voltage measuring system. A voltage is applied across the conductive layer (the polymer-containing nanotubes) in the sensor, which may again be parallel with, perpendicular to or angled with respect to at least one dimension along which stress and elongation is expected during use, and the changes in the current (and/or voltage) is measured and the changes are correlated to stress and/or percentages of elongation in the article. As the current passed between sensors will change in a repeatable manner no matter what the orientation between the current flow and the elongation/pressure may be, a look-up table or other correspondence between the elongation/strain/pressure and changes in current can be established as a reference.

The flexible, elastic and/or expandable membrane may be secured to a surface or molded within an expandable elastomeric device that is to be manipulated or mechanically processed or chemically processed, where such processing or handling has surrounding concerns about changes in stress, dimensions, pressure or the like that can be measured by piezoresistive measurements. An elongate element, such as a sensor tube for example, may be a conductive nanotube-containing polymer of from 0.5 microns to 25 microns in thickness, preferably from 5 to 25 microns in thickness and 0.2 to 10 mm in width, and from 2 to 100 mm in length. A patch may comprise a square or rectangular OR oval or other geometric shape flat material comprising a conductive nanotube-containing polymer and two opposed edges. The electrodes are positioned at or about the opposed edges, the current is passed through the polymer, stress is applied to the patch, and the change in current is measured and correlated with amounts of stress and/or dimensional changes.

Various aspects of the invention include a piezoresistive sensor having an electrically conductive elastic body having at least one pair of opposed ends, and the elastic body containing conductive nanotubes homogeneously distributed therein, the elastic body having at least one surface with physical attaching elements thereon and the elastic body having electrodes attached at each of the at opposed ends. The conductive elastic body (that is the actual body of the sensor made from a composition) has an elastic range of between about 5% elongation and about 500% elongation. The conductive elastic body may have for example, from about 0.02% to 8% by total weight of the elastic body (not including electrodes) of conductive nanotubes. Preferably the conductive nanotubes are from about 0.2 to 5% by total weight of the conductive elastic body. The conductive nanotubes may be carbon nanotubes. The elastic body may be a polymer as described herein. The polymer may, by way of non-limiting examples, be selected from the group consisting of epoxy resins, silicone resins, ethylenically unsaturated elastomeric resins, and natural rubbers. The physical attaching elements are selected from the group consisting of polymers, chemical adhesives, adhesive tapes or mechanical attachments.

The present technology also includes a method of directly sensing pressure or pressure changes or sensing dimensional changes or stress changes which correspond to force changes or pressure changes on a substrate including steps (not necessarily in the following order) of: non-destructively attaching a piezoresistant membrane sensor to a surface of the device or molding the piezoresistant sensor within the device, especially where fluidic pressure from use or contact with the device can deform the deformable sensor, the piezoresistant sensor comprising an electrically conductive elastic body having at least one pair of opposed ends, and the elastic body containing conductive nanotubes homogeneously distributed therein, the elastic body having at least one surface with two opposed ends and electrodes at each of the opposed ends, passing a current through the elastic body between the two electrodes, sensing the current passing through the elastic body, performing a mechanical step on the substrate, and measuring changes in the current between the electrodes. The measured changes may be identified by an electronic look-up table or other execution of software by a processor receiving information/signals of the changes to identify changes in properties or conditions that are being monitored. The information may then be displayed on a video monitor if desired. The measured changes in current between the electrodes is related by execution of code in a processor to a pressure, stress level or change in dimension during performing of the expansion of the device mechanical step.

The invention also relates to a sensor having a deformable membrane which may act to sense pressure, contact, force, deformation or other physical events, directly or indirectly for use in any device or system in which stress or dimensional changes are to be determined, by way of non-limiting examples, tubes, balloons or coronary, vascular, orthopedic, and pelvic health applications and devices to provide information or measurement on the stress, elongation, pressure, or load that is applied directly or indirectly to a deformable membrane according to the present technology.

To achieve desired or designed electrical properties to a polymer or elastomer as described herein, such as an epoxy resin, elastomeric polymer or rubber, addition of moderate percentages, such as between 0.5% up to 4% by total weight of the polymer of conductive nanoparticles and especially carbon nanoparticles may be used. Loading with larger conductive particles such as carbon black at levels above 10% by total weight of the composition or total weight of the elastomer, often result in compromised physical properties such as hardness, tensile, thermal and compression. In addition, the electrical conductivity is negatively altered upon large deformations of the material to the point whereby electrical contact between the conducting particles is broken. The addition of very small amounts, even less than 2% by total weight of the composition (as described herein), of carbon nanotubes increases the electrical conductivity of the base material while preserving desired physical properties of the original polymer. The relatively lower loading of carbon nanotubes to a silicone rubber elastomer preserve desired original liquid silicone rubber physical properties such as hardness, tensile, elongation and compression. Low loading, by weight, of carbon nanotubes to a base polymer significantly changes the electrical properties. For example, a 0.5% or 1.0% loading of multi-wall carbon nanotubes dispersed into a liquid polymerizable to a silicone rubber, changes the resistivity of the original silicone rubber elastomer from $10^{13}$ $\Omega$cm to $10^3$ $\Omega$cm, with no significant change in the other important properties of the original properties. Additionally, large deformations of the nanotube composite do not negatively affect the electrical conductance of the material rather the electrical conductivity is maintained.

Also considered within the scope of this disclosure are: types of sensor devices and/or systems used to determine and/or measure strain or pressure. The sensors are used to determine and/or measure the amount of pressure or strain applied to an associated surface and used to determine and/or measure tissue thickness, and to determine or measure pressure and/or to provide pressure or strain data to a processor which correlates the pressure data with tissue thickness using a look-up table or other data structure. By knowing the strain or pressure data, a surgeon or technician can then determine the proper alignment of the device before completing the medical procedure.

The processor may be housed in a remotely programmable apparatus which also includes a memory for storing the script programs and the responses to voltage data flow. The remotely programmable apparatus may further include a microprocessor connected to the wires (effectively the communication device from the sensor, with or without a preamplifier), a user interface, and the memory. The microprocessor executes the script programs to identify the strain, communicate the results sets to the practitioner (e.g., through a monitor or printed output or audio signal), receive possible responses to the results of the data (e.g., a signal to readjust the device or reduce the exhibited strain), and transmit the responses to the server and/or monitor through communication networks.

The system may also include wireless communication between the voltage meter reading sensor output and the processor. For example, a microprocessor may be preferably connected to memory using a standard two-wire $I^2C$ interface or using a wireless connection. The microprocessor is also connected to user input buttons to initiate activity, alter read-outs requested, respond to signals from the sensor, start a print-out, and the like (as through an I/O port or dedicated printer port, LED, a clock and a display driver. The clock could indicate the current date and time to the microprocessor and measure duration of strain or pressure. The clock may be a separate component, but is preferably built into microprocessor. The display driver operates under the control of microprocessor to display information on a video display or monitor. The microprocessor may be any microprocessor in any format, including a laptop (PC or Mac) and operate on any operating system, including Linux. For example, a PIC 16C65 processor which includes a universal asynchronous receiver transmitter (UART) is an example of a useful processor for communicating with a modem and a device interface. A CMOS switch under the control of the microprocessor alternately connects modem and interface to the UART.

For the purposes of the implementation of the invention, a study was conducted using very low loadings of carbon nanotubes in an elastomeric liquid silicone rubber polymer. The resultant data concluded that desirable electrical properties were conferred to the liquid silicone rubber elastomeric polymer with relatively low, e.g., less than 4% or less than 3%, loadings of multi-walled carbon nanotubes. In addition, the study showed that the desired physical properties were maintained, and that no diluent behavior was observed. Further, the study showed that uniform resistivity was achieved throughout the liquid silicone carbon nanotube rubber composite. These conclusions support the inference that a liquid silicone carbon nanotube rubber composite can be effectively designed as an electrically conductive elastomeric material, while maintaining desirable physical properties such as tensile strength, elongation to break, compression set and hardness.

Conventional and nano static and dynamic properties testing of materials, such as tensile, elongation, compression set, Dynamic Mechanical Analysis, surface and volume resistivity, etc., are often used to characterize material properties. Values from these tests are considered in the choice of materials suitable for application in the flexible sensor. Such test were conducted on carbon nanotube liquid silicone rubber composites to evaluate the effect of different loadings of carbon nanotube with different liquid rubbers.

In addition, for the purpose of the invention, a study was conducted using very low loading of carbon nanotubes in an elastomeric silicone rubber polymer, measuring the changes in the electrical resistivity of the composite polymer during deformation. The changes in resistivity were measured as a function in the change of the output current of the material with a constant voltage applied to the material. The study compared loadings, by weight, of carbon nanotubes homogeneously mixed in the standard silicone polymers of between 0.5% and 2%. The resultant composites were deformed under various loading conditions and the change in resistivity of the composite monitored. For the purpose of the medical application, the study used voltages of between 0.01 and 1 volts, although greater voltage may of course be used. The study conducted measured large repeated deformations such as tensile strain in the order of 10 mm elongation as well as small deformation in the order of microns. The resultant change in resistivity correlated with the amount of deformation or force applied to the polymer composite. Although the term "constant voltage" is used, other electrical measurements are also used. For example, a constant current may be used (and voltage measured) It is also possible to use any other means such as resistive bridge circuit configurations or ballast circuits to determine resistance change.

Another aspect of the present technology includes accurate measurement of the amount of deformation of, strain exhibited on, or pressure exerted upon, an elastomeric medical device or component or sub-component inserted into a patient is determined by utilizing a sensor as described herein attached to or molded within the elastomeric medical device and exhibiting the above described piezoresistive properties that conductive nanotubes confer to an elastic medium. Such a sensor can be used to measure elongation or strain of a medical device during insertion, or immediately after insertion or even long after insertion into the patient. Such a sensor can also measure the deformation or load that is placed upon the medical device by the organ or with the body part with which the medical device is in contact. That measurement may be a direct pressure measurement, or by comparing strain with known degrees of pressure applied perpendicular to the sensor (and using a look-up table). Such a sensor may also be used to measure the amount of pressure that is being applied to a body part by the medical device. Such a sensor may also be used to monitor changes over time of the elongation, deformation, strain, load or pressure of an object or body part to which the sensor is affixed.

The present invention also relates to an electrically conductive rubber whereby the conductive agent applied to a flexible polymer base may be carbon nanotubes. The carbon nanotubes loadings are dispersed homogeneously into the polymer base such that the flexibility of the original base polymer is not dramatically compromised, and such that the electrical response of the composite is not significantly compromised (e.g., by more than 15%) over repeated deformations (e.g., over 20 deformations with greater than 100% elongation). A constant voltage is applied to the sensor and the electrical current is monitored at a point some distance from the voltage input through electrical connection with the electrodes or wires on the sensor. As the sensor is deformed, the current will change in response to the deformation due to the change in electrical resistivity of the composite material. For sensing deformation in devices in medical applications, the input voltage may be very low, in the order of less than 1 volt (e.g., 0.05 up to 1 volt), depending upon the electrical conductivity of the composite polymer. For medical applications the nanotube composite may be incased within a flexible polymer to insulate the electrically conductive composite and to comply with FDA regulations that may concern nano particle exposure.

The invention further relates to a sensor for which elongation and/or stress of the sensor is directly related to the distance that the sensor, or the medical device to which the sensor is affixed, is pulled, stressed, flexed, expanded or compressed. The distance may be a continuous pull, inflated expansion or compression or an incremental pull, stress, inflated expansion or compression of the sensor. The change in resistivity of the nanotube composite sensor directly correlates to the change in distance that the sensor is pulled, stressed, flexed or compressed. The change in resistivity may be measured directly as a change in resistance or as the change in current when a constant voltage is applied. Additionally, the load placed upon the sensor, or the medical device to which it is affixed or molded within, can be determined likewise by the change in resistivity of the nanotube composite sensor.

Various other aspects of the invention also relate to a flexible electrically conductive nanotube silicone rubber composite that is contained within a non electrically conductive medical grade silicone rubber, for the express purpose of distance, inflated expansion, compression or load measurement by observing the change in electrically resistivity of the nanotube composite. The attaching element can be used to attach the sensor directly to other sensors or devices attached to a medical patient for the purpose of measuring the stress or strain or other applied forces to the device. Additionally a sensor is described having at least an elastic body containing conductive nanotubes homogeneously distributed therein, the sensor contained or attached to or molded within an elastic body not containing conductive nanotubes and not electrically conductive, of which at least one surface of the sensor with physical attaching element thereon. Where embedded in another material, the attaching members assure elongation along with the embedding body.

Another aspect of the technology includes a sensor comprising of an elastic body comprised of a silicone rubber containing a loading of between 0.5% and 3%, by wt. of conductive nanotubes such as carbon nanotubes, homogeneously distributed therein, with electrodes adhered to or molded within the nanotube composite for the purpose of applying an electrical current through the composite and a detection system that detects absolute amounts of voltage and/or changes in voltage across the electrodes.

A further aspect of the present technology may include a sensor having an elastic body comprised of a liquid silicone rubber containing a loading of between 0.5% and 3%, by wt. of carbon nanotubes, homogeneously distributed therein, with electrodes adhered to or molded within the nanotube composite and contained entirely within a medical grade non conductive flexible silicone rubber.

Another aspect of the present invention may include an electrically conductive silicone rubber composite comprised of a liquid silicone rubber with a multi-wall carbon nanotube loading of between 1%-3% by weight and a hardness between 10 and 60 Asker C hardness.

An electrically conductive silicone rubber composite comprised of a liquid silicone rubber with a multi-wall carbon nanotube loading of between 0.5%-3% by weight, a hardness of between 10 and 60 Asker C and elongation property greater than 200%.

An electrically conductive silicone rubber composite comprised of a liquid silicone rubber with a multi-wall carbon nanotube loading of between 1%-3% by weight, a hardness of between 10 and 60 Asker C, an elongation property greater than 200% and electrical resistivity of $10^3$ Ohm/sq or less.

Reference to the Figures will advance an even greater appreciation of the present technology. FIG. 1 shows a perspective view of a membrane 10 useful in the practice of the present technology. The membrane 10 is shown with the elastomeric or rubbery deformable composition 12 carrying the nanoparticles 14. The two electrodes 16 and 18 are shown. A current or voltage is applied across the electrodes, with on end connected to the appropriate voltmeter or ammeter. As resistance through the composition 12 varies with deformation of the membrane 10, measurements in the voltmeter or ammeter (not shown) will predictably vary.

Figure 2:
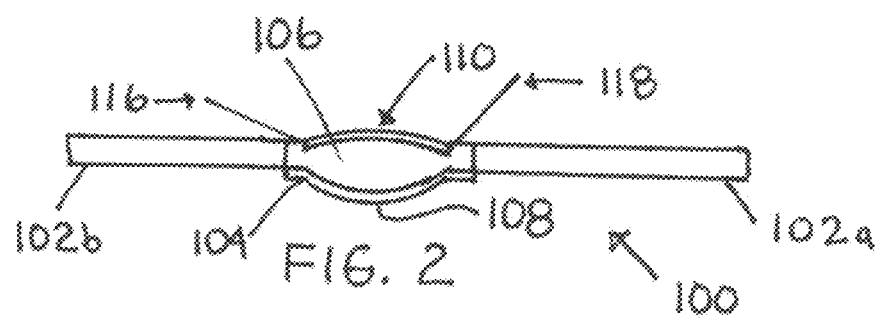
FIG. 2 shows a "bubble component" using the membrane element of FIG. 1 as a component which can sense physical conditions according to the present technology.

FIG. 2 shows a "bubble component" 100 using the membrane 110 of FIG. 1 as a component which can sense according to the present technology. The bubble component 100 is shown with two solid arms 102a and 102b that support the membrane 110 and a flexible pressure contact layer 104. The membrane 110 and a flexible pressure contact layer 106 having an elevated pressure application surface 108 confine a fluid with a pocket 106. Pressure on the flexible pressure application surface 108 will transmit the pressure through the liquid in the pocket 106 to the membrane layer 110. The altered pressure against the membrane 110 will cause deformation in the membrane 110 which will alter the current through the electrodes 116 and 118. This bubble component 110 may be built into devices or retrofit into devices where pressure or force measurement is at a surface or area where the pressure application surface 108 can be exposed.

Figure 3:
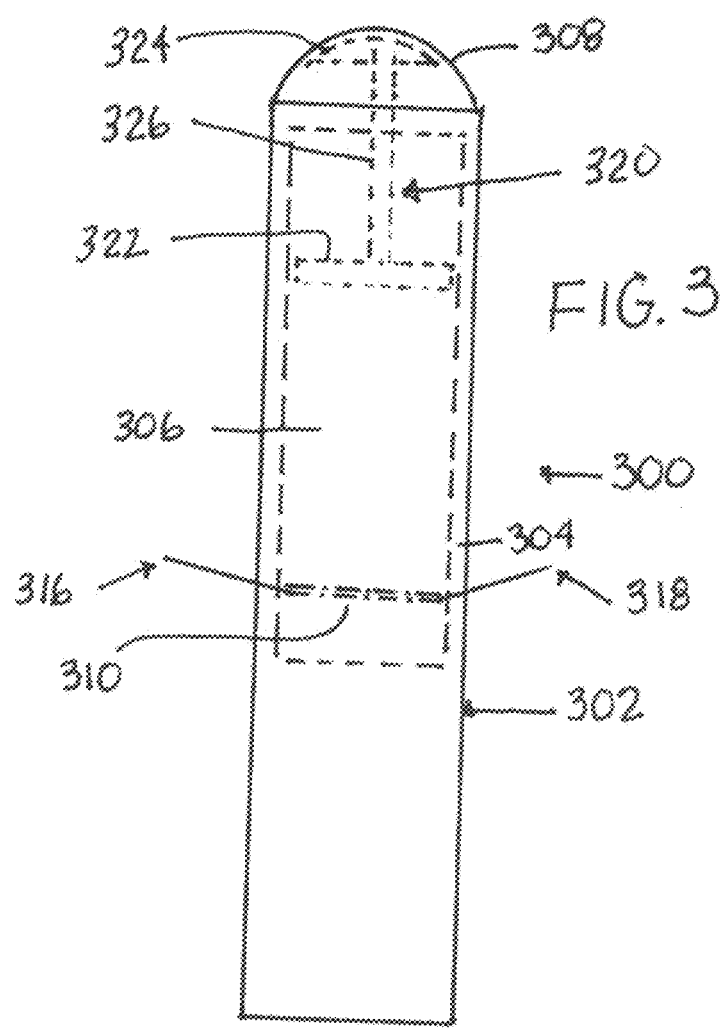
FIG. 3 shows a tubular device which can sense pressure or force application as a measuring, testing or training device.

FIG. 3 shows a tubular device 300 which can sense pressure or force application as a measuring, testing or training device. The tubular device 300, here being discussed as a neuropathy evaluation device, has a housing 302 where a wall 304 encloses a fluid chamber 306. Within the fluid chamber 306, a membrane 310, according to the present technology, is in contact with entrapped fluid in a manner such that application of pressure or reduction of pressure through the entrapped fluid against the membrane 310 will cause deformation in the membrane 310. Electrodes 318 and 316 are used in a manner similar to the electrodes in the previous figures and as elsewhere described herein for applying current or voltage across them and measuring changes upon deformation of the membrane 310. A pressure application surface 308 is shown. In one embodiment, pressure against the pressure application surface 308 will depress the surface itself, which when in contact with fluid entrapped within the chamber 306 will cause a change in pressure against the membrane 310. In an alternative embodiment, pressure against the pressure application surface 308 will cause contact with a pressure plate 324, which is part of a piston system 320. Force against the pressure plate will drive the piston head 322 downward by force transmitted through the shaft 326. Movement of the piston head 322 resulting from contact with pressure application surface will change the pressure on the liquid in the chamber 306 and deform the membrane 310 so that the relative amount of pressure/force applied to the pressure application surface 308 can be measured. The degree of force and pressure variations that can be measured can provide exceptionally accurate, repeatable and dependable measurements.

Figure 4:
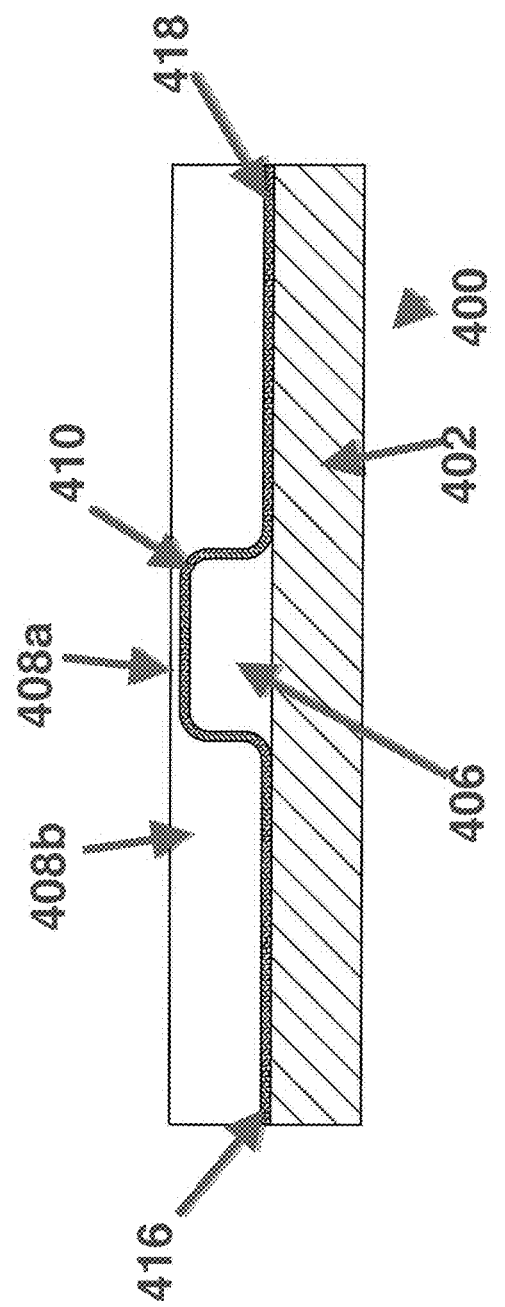
FIG. 4 shows a laminated sensor using a membrane as a component which can sense according to the present technology. The sensor membrane is attached to a flexible contact layer.

FIG. 4 shows a laminated sensor 400 using a membrane 410, with a thickness of about 15 microns, as a component which can sense according to the present technology. The sensor membrane is applied to a flexible contact layer 408, where region 408a has a thickness of about 15 microns and the surrounding flexible contact layer 408b having a thickness of about 50 microns or greater. The flexible contact layer is adhered to a solid support base 402 such that a "bubble component" 406 is formed. Pressure on the flexible contact layer 408a will deform the membrane sensor 410 to which it is bonded. The deformation changes the electrical resistance of the membrane sensor 410. Electrodes 416 and 418 are used in a manner similar to the electrodes in the previous figures and as elsewhere described herein for applying current or voltage across them and measuring changes upon deformation of the membrane 410.

Figure 5A:
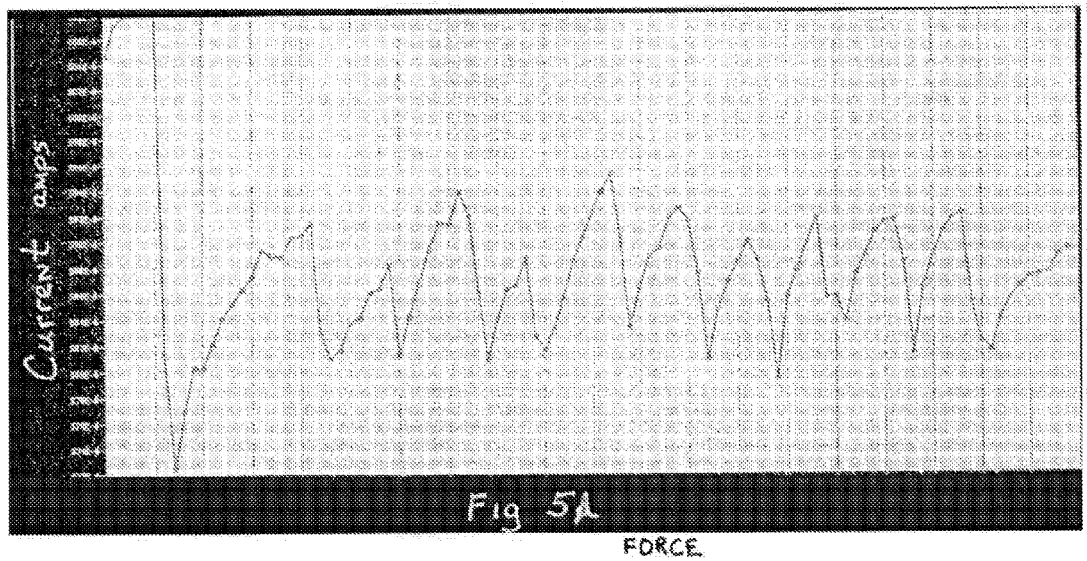
FIGS. 5A and 5B shows test results of neuropathy test results using the device of FIG. 3.

FIG. 5A shows the response output of a sensor depicted in FIG. 3. The output is in response to a neuropathy evaluation device whereby the conformable membrane sensor 308 responds to a series of finger tip touches of about 0.001 to 0.003 Newtons force. The sensor response maximum corresponds to the "feeling" of the touch to the membrane surface.

Figure 5B:
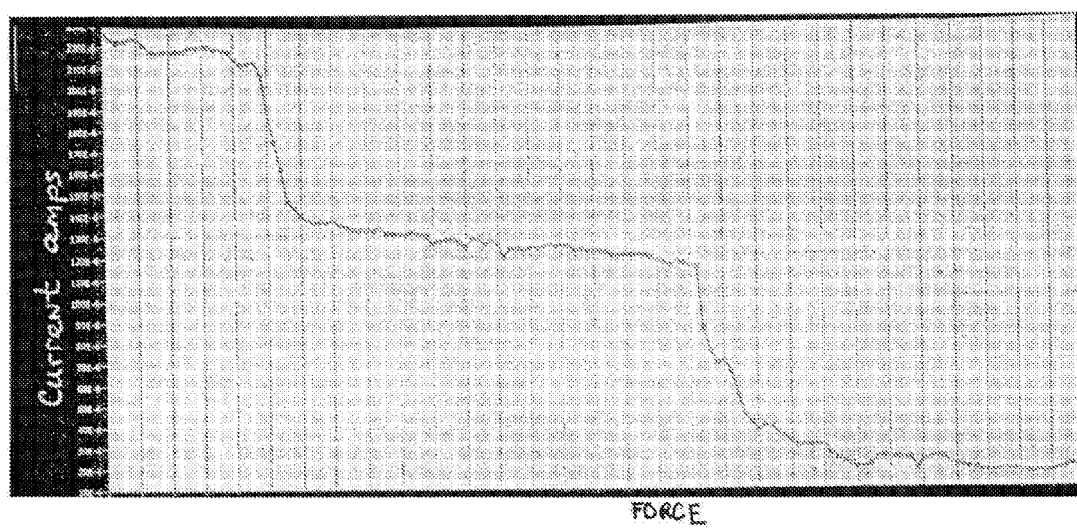

FIG. 5B shows an example response output of a sensor design depicted in FIG. 2 or 4. The output is given as a change in current due to the resistance change of the conformable membrane sensor. The output is indicative of the response of the membrane sensor 110 in FIG. 2 or the membrane sensor 410 in FIG. 4 as the sensor is immersed into a column of water at 100 mm depth intervals. FIG. 5B shows a 100 mm decent, hold, then 100 mm further decent.

Although specific dimensions, compositions, voltages, materials and fields of use are described herein, it must be understood that these are examples enabling the generic scope of the invention and should not limit the scope of enforcement of claims herein.

What is claimed:

1. A pressure sensing element comprising:
a housing defining a tubular fluid chamber containing a fluid therein;
a pressure application surface operably coupled to a moveable piston positioned proximal to a first end of the tubular fluid chamber and in contact with the fluid, the piston configured to shift relative to the housing when an external pressure is applied to the pressure application surface, thereby affecting a change in fluid pressure; and
a deformable piezoresistive membrane in contact with the fluid, wherein the deformable piezoresistive membrane comprises an elastomer having conductive carbon nanoparticles distributed therein, and is configured to change in electrical resistance when deformed by pressure changes in the fluid.

2. The pressure sensing element of claim 1 wherein the deformable piezoresistive membrane has the two electrodes attached to deformable material in the membrane.

3. The pressure sensing element of claim 2 wherein the conductive carbon nanoparticles are conductive nanotubes.

4. The pressure sensitive element of claim 3 wherein the deformable piezoresistive membrane comprises an elastic body of a silicone rubber containing a loading of between 0.5% and 3%, by total weight of conductive nanotubes.

5. The pressure sensing element of claim 2 wherein the fluid in the housing comprises a gas.

6. The pressure sensing element of claim 2 wherein the fluid in the housing comprises a liquid.

7. The pressure sensing element of claim 2 wherein the pressure application surface comprises a film at one end of the housing.

8. The pressure sensitive element of claim 7 wherein the two electrodes of the deformable piezoresistive membrane are in communication with both a power source and a processor.

9. The pressure sensing element of claim 2 wherein the pressure application surface is separate from the deformable piezoresistive membrane by a distance within the fluid of between 0.1 and 20 mm.

10. The pressure sensing element of claim 2 wherein the pressure application surface is separate from the deformable piezoresistive membrane by a distance within the fluid of between 0.1 and 5 mm.

11. The pressure sensing element of claim 2 wherein the pressure application surface is separate from the deformable piezoresistive membrane by a distance within the fluid of between 0.1 and 2 mm.

12. The pressure sensing element of claim 2 wherein the housing comprises a tubular wall defining the tubular fluid chamber, with the pressure application surface positioned proximal to a first end of the tubular fluid chamber and the deformable piezoresistive membrane positioned proximal to a second end of the tubular fluid chamber.

13. The pressure sensitive element of claim 12 wherein the two electrodes of the deformable piezoresistive membrane are in communication with both a power source and a processor.

14. The pressure sensitive element of claim 2 wherein the deformable piezoresistive membrane has a thickness of between 4 and 50 microns.

15. The pressure sensitive element of claim 2 further comprising a source of voltage between 0.01 and 10 volts applied to one electrode and a current sensor on the second electrode.

16. The pressure sensitive element of claim 2 wherein the at least two electrodes of the deformable piezoresistive membrane are in communication with both a power source and a processor.

17. The pressure sensitive element of claim 2 wherein a separation of at least 0.01 mm is maintained between the pressure application surface and the deformable piezoresistive membrane when a weight of 5 grams is applied to the pressure application surface.

18. The pressure sensitive element of claim 17 wherein the two electrodes of the deformable piezoresistive membrane are in communication with both a power source and a processor.

19. A method of detecting pressure comprising providing a current into a first of the electrodes of the two electrodes of the pressure sensitive element of claim 2, comprising:
   providing a voltmeter or ammeter to a second of the two electrodes;
   applying a pressure to the pressure application surface to cause a change in the current or voltage measured by the voltmeter or ammeter; and
   comparing the change in the current or voltage to a lookup table to identify a magnitude of the pressure applied to the pressure application surface.

20. A method of detecting pressure comprising providing a current into a first of the electrodes of the two electrodes of the pressure sensitive element of claim 2, comprising;
   providing a voltmeter or ammeter to a second of the two electrodes;
   applying a pressure to the pressure application surface to cause a change in the current or voltage measured by the voltmeter or ammeter;
   forwarding a signal indicating the change in the current or voltage to a processor; and
   executing a code to indicate a magnitude of the pressure applied to the pressure application surface.

21. The pressure sensitive element of claim 1 wherein the deformable piezoresistive membrane comprises an electrically conductive silicone rubber composite comprised of a liquid silicone rubber with a multi-wall carbon nanotube loading of between 1%-3% by weight and a hardness between 10 and 60 Asker C hardness.

* * * * *